United States Patent

Kogure

[11] Patent Number: 5,180,403
[45] Date of Patent: Jan. 19, 1993

[54] METHOD FOR VACUUM DEAERATION

[75] Inventor: Masahiko Kogure, Miyagi, Japan

[73] Assignee: Nomura Micro Science Co., Ltd., Atsugi, Japan

[21] Appl. No.: 798,157

[22] Filed: Nov. 26, 1991

[30] Foreign Application Priority Data

Nov. 26, 1990 [JP] Japan .................. 2-321854

[51] Int. Cl.⁵ .............................................. B01D 19/00
[52] U.S. Cl. .......................................... 55/53; 55/55
[58] Field of Search .................. 55/53, 55, 189, 196

[56] References Cited

U.S. PATENT DOCUMENTS

| | | | |
|---|---|---|---|
| 3,362,132 | 1/1968 | Schellenberg | 55/55 X |
| 3,898,058 | 8/1975 | McGill | 55/53 X |
| 3,946,534 | 3/1976 | Egly | 55/53 X |
| 4,017,276 | 4/1977 | Bloem | 55/51 |
| 4,136,747 | 1/1979 | Mallory et al. | 55/53 X |
| 4,259,360 | 3/1981 | Venetucci et al. | 55/55 X |
| 4,565,634 | 1/1986 | Lydersen | 55/55 X |
| 4,612,021 | 9/1986 | Bland et al. | 55/53 |
| 4,752,306 | 6/1988 | Henriksen | 55/53 X |
| 4,869,732 | 9/1989 | Kalfoglou | 55/55 X |
| 4,927,433 | 5/1990 | Wieland et al. | 55/53 X |
| 4,937,004 | 6/1990 | Mandrin et al. | 55/53 X |
| 5,006,133 | 4/1991 | Mandrin et al. | 55/53 |

FOREIGN PATENT DOCUMENTS

| | | |
|---|---|---|
| 0327491 | 8/1989 | European Pat. Off. . |
| 58-133885 | 8/1983 | Japan ....... 55/53 |
| 59-179113 | 10/1984 | Japan . |
| 61-200818 | 9/1986 | Japan ....... 55/189 |
| 61-35274 | 10/1986 | Japan . |
| 2-90984 | 3/1990 | Japan . |
| 0955976 | 9/1982 | U.S.S.R. ....... 55/196 |
| 2132502 | 7/1984 | United Kingdom . |
| 2202167 | 9/1988 | United Kingdom . |
| 2223960 | 4/1990 | United Kingdom . |

OTHER PUBLICATIONS

Patent Abstracts of Japan, Feb. 9, 1985, & JP-A-59 179 113, Oct. 11, 1984, H. Makihara, et al.,: "Degassing Method of Gas Dissolved in Oil".

Primary Examiner—Robert Spitzer
Attorney, Agent, or Firm—Oblon, Spivak, McClelland, Maier & Neustadt

[57] ABSTRACT

A method for vacuum deaeration of a dissolved gas in a pure water, the pure water having a specific resistivity of not less than 0.1 MΩ·cm, in a vacuum degasifier column maintained at a pressure slightly higher than a saturated steam pressure at a temperature of the pure water, the column having a region filled with packings, spraying the pure water downwardly from above the region and meantime evacuating inside the column to maintain the pressure, the method comprising the steps of: carrying out the evacuation from above the region to maintain a pressure made by adding 1 mmHg to 10 mmHg to the saturated steam pressure at the temperature of the pure water inside the vacuum degasifier column; and introducing an inert gas upwardly from below the region at a volumetric flow rate in the range of from 0.001 to 1.0, based on the volumetric feed flow rate of the pure water taken as 1, simultaneously with the evacuation, to lower a dissolved oxygen concentration in the pure water below 10 ppb.

6 Claims, 1 Drawing Sheet

METHOD FOR VACUUM DEAERATION

BACKGROUND OF THE INVENTION

This invention relates to a method for effecting vacuum deaeration with improved operational efficiency and more particularly to a method for vacuum deaeration which fits the deprivation of dissolved oxygen in pure water.

In the system using pure water, the pure water is required to possess an extremely low dissolved oxygen concentration for the purpose of preventing various component parts of the system such as, for example, pipes, heat exchangers, and boilers from corrosion or protecting ion-exchange resin against deterioration by oxidation.

Particularly, in recent years, the field of electronic industry specializing in the production of LSI's and super-LSI's has come to feel the need of pure water possessing a finally attainable dissolved oxygen concentration of not more than 10 bbp to ensure prevention of the formation of a native oxide film on semiconductor wafers.

In the methods heretofore available for decreasing the dissolved oxygen content in water, the method for vacuum deaeration using a vacuum degasifier column, the method for heat deaeration using a heat deaerator, the nitrogen bubbling method for depriving water of dissolved oxygen by bubbling nitrogen gas through the water, the method for membrane deaeration which deprives water of dissolved gas by passing the water through a hydrophobic membrane and vacuumizing the outer side of the membrane, and the method for catalytic deaeration which comprises causing dissolved oxygen to react with a reducing agent thereby effecting removal of the oxygen as converted into water, for example, have been renowned.

The method for heat deaeration has the disadvantage that the heat deaerator is difficult to handle and is prone to external contamination; the nitrogen bubbling method has the disadvantage that since the treated water is saturated with nitrogen, the dissolved nitrogen will eventually depart in the form of bubbles from the treated water; the method for membrane deaeration has the disadvantage that the use of the special membrane boosts the running cost of the operation; and the method for catalytic deaeration has the disadvantage that the use of expensive Pd adds to the cost of operation.

The method for vacuum deaeration effects the removal of dissolved oxygen from water by keeping the pressure inside the vacuum degasifier column at a degree of vacuum slightly higher than the vapor pressure at a prescribed water temperature and causing the water meanwhile to be sprayed downwardly onto packings placed in the column. Owing to high economy and freedom from the danger of contamination, this method has been finding popular acceptance. This method, however, is deficient in capacity of deaeration because the lowest attainable dissolved oxygen concentration is rather high, reaching the order of some tends of ppb.

Japanese Patent Application Disclosure (KOKAI) HEI 2(1990)-909,844 and Japanese Utility Model Publication SHO 61(1986)-35,274 disclose methods for effecting gas-liquid contact by injecting an inert gas into the interior of a column and meantime causing a water subjected to treatment to fall down the column interior from above. By these methods, however, the gasliquid contact is carried out invariably under the atmospheric pressure and the treated water is not deaerated.

Japanese Patent Application disclosure (KOKAI) SHO 59(1984)-179,113 discloses a method for deaerating a seal oil by causing an inert gas to leak into a vacuum degasifier column and allowing a flow of the inert gas to contact a flow of the seal oil. This method is aimed at volatilizing such low boiling inflammable gas components as hydrocarbons and $H_2S$ in the seal oil thereby lowering the flash point of the seal oil and preventing the seal oil from hazards of fire and explosion while storage. The present invention which accomplishes the removal of a dissolved gas present in a minute amount in water is suggested nowhere in this patent application disclosure (KOKAI).

SUMMARY OF THE INVENTION

The first object of this invention resides in providing a method for effecting vacuum deaeration with improved operational efficiency such that the lowest attainable dissolved oxygen concentration is below 10 ppb. The second object of this invention resides in providing a method for effecting vacuum deaeration with improved operational efficiency such that the conventional vacuum degasifier column is rendered usable for the vacuum deaeration through a minor remodeling and operable easily at a low running cost and the lowest attainable dissolved oxygen concentration is below 10 ppb. The third object of this invention resides in providing a method for effecting vacuum deaeration with improved operational efficiency such that the water under treatment suffers no evolution of bubbles and the lowest attainable dissolved oxygen concentration is below 10 ppb. The other objects of this invention will become apparent as the disclosure is made in the following description of the invention, as illustrated in the accompanying drawing.

The objects of this invention described above are accomplished by a method for effecting the vacuum deaeration of a dissolved gas in a raw liquid subjected to treatment by preparing a vacuum degasifier column maintained at a pressure slightly higher than the saturated steam pressure at the temperature of the raw liquid and having a region filled with packings, spraying the raw liquid downwardly onto the region filled with the packings and meantime evacuating the interior of the column thereby ensuring the aforementioned maintenance of the pressure, which method is characterized by carrying out the evacuation of the interior of the vacuum degasifier column from above the region filled with the packings and introducing, simultaneously with the evacuation, an inert gas upwardly from below the region mentioned above at a volumetric flow rate in the range of from 0.001 to 1.0, preferably from 0.01 to 0.5, based on the volumetric feed flow rate of the raw liquid to be supplied taken as 1.

To the design of the vacuum degasifier column constructed as described above, the technique available for designing gas dispersion can be applied, in accordance with the Henry's law governing the relation of equilibrium between a gas and a liquid. The volumetric feed flow rate of the raw liquid subjected to treatment, the concentration of dissolved gas in the raw liquid, the height of the column, the height of the bed of packings, the kind of packings, and the surface area of the packings available for the treatment, therefore, can be found by calculations. These calculations are described in detail in Perry's "Chemical Engineer's Handbook," Sixth Edition, Section 14, McGraw Hill.

Here, only the main points of this design will be described below.

The linear velocity (LV: $m^3/m^2/h$) inside the column in its empty state is selected in the range of from 50 to 100 in the operation of the sort of interest.

The degree of vacuum in the vacuum degasifier column properly is in the range of from $A+1$ to $A+10$ mmHg, wherein A (mmHg) stands for the pressure of the saturated steam at the temperature of the raw liquid. For the accomplishment of the present invention, the volumetric flow rate of the inert gas is required to be in the range of from 0.001 to 1.0, based on the volumetric feed flow rate of the raw liquid taken as 1.

The inert gasses which are effectively usable in this invention include nitrogen gas and argon gas, for example. The method of this invention prefers nitrogen gas over argon gas in point of inexpensiveness.

The method of this invention is fit for the removal of dissolved oxygen from pure water having a specific resistivity of not less than 0.1 $M\Omega$·cm. Besides the removal of dissolved oxygen from a raw liquid, this invention is usable for the removal of dissolved carbon dioxide gas and other gases than the inert gas being used for the treatment from given raw liquids containing such dissolves gases in a minute amount.

BRIEF DESCRIPTION OF THE DRAWING

The drawing is a diagram schematically illustrating one example of the vacuum degasifier column to be used in embodying the present invention.

DETAILED DESCRIPTION OF THE PREFERRED EMBODIMENTS

Figure 1:
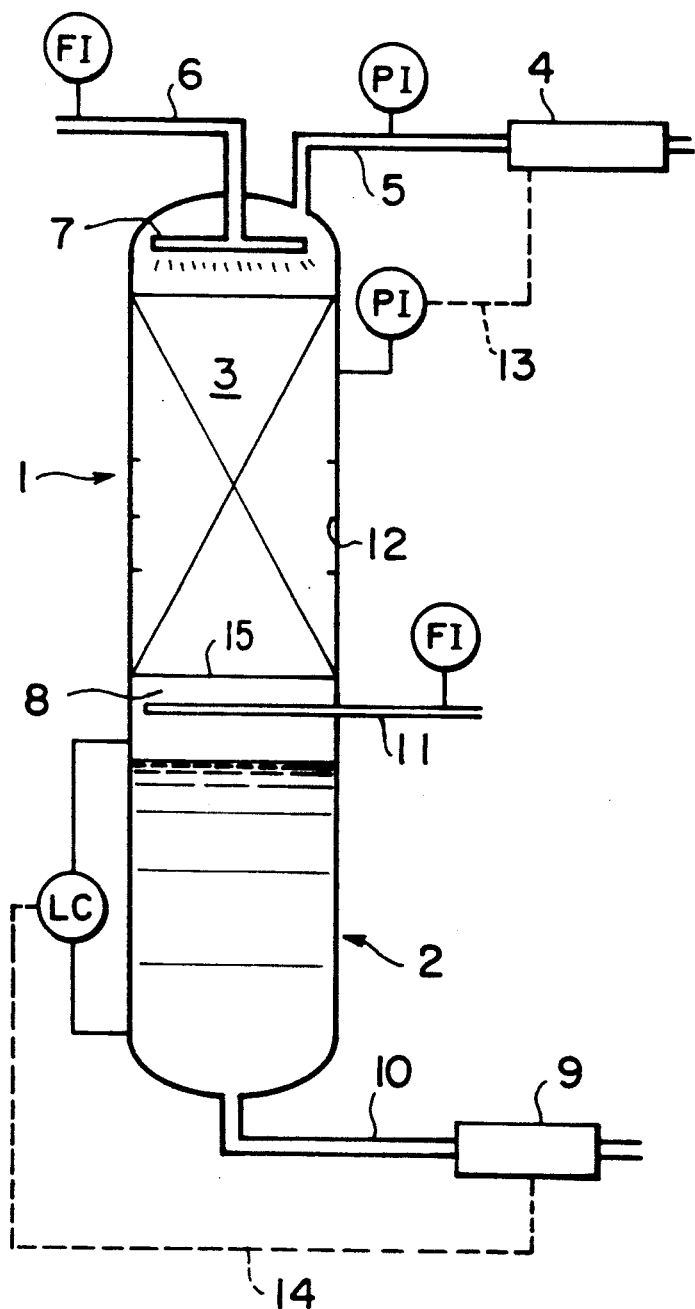

Now, this invention will be described below with reference to the accompanying drawing.

The drawing schematically illustrates one example of the vacuum degasifier column of the present invention. This vacuum degasifier column (0.25 m in diameter and 8 m in height), though illustrated with omission of details, is designed in accordance with the conventional theory of gas absorption. It has the main part thereof composed of a vacuum degasifier column proper 1 and a storage part 2 for treated liquid.

The vacuum degasifier column proper 1 is packed with packings ("Terallet Type S, "50 mm in diameter, 20 t, 180 $m^2/m^3$ in surface area) (packed bed 4.1 m in height and 1.05 $m^2$ in cross-sectional area). A vacuumizing device such as, for example, a degasifying pipe 5 connected to a vacuum pump 4, which is adapted to evacuate the interior of the vacuum degasifier column proper 1 opens above the region filled with the packings, i.e. into the top part of the vacuum degasifier column proper 1. Near this opening of the vacuumizing device, a liquid dispersing device 7 such as a spray nozzle connected to a liquid supply pipe 6 and adapted to supply a raw liquid under treatment is disposed in such a manner as to spray the raw liquid downwardly, namely in the direction of the packings 3. Below the region filled with the packings 3, a partition plate 15 permeable to gas and liquid is disposed. An empty part 8 is provided below the partition plate. The raw liquid which is sprayed from the liquid dispersing device 7 and treated by the downward of itself flow through the bed of packings 3 drops through the empty part 8 into the treated liquid storage part 2. The treated raw liquid is supplied to the subsequent step through a treated liquid transfer pipe 10 which is opened into the bottom part of the treated liquid storage part 2 and provided with a transfer pump 9. In the vacuum degasifier column, an inert gas supply pipe 11 adapted to advance the flow of an inert gas such as nitrogen gas to the interior of the vacuum degasifier column proper 1 opens into the empty part 8.

In the diagram, 12 stands for a ring for re-distribution disposed on the inner wall of the region filled with the packings inside the vacuum degasifier column proper 1, 13 for a feedback control system for the vacuum pump 4, 14 for a feedback control system for the pump 9, F1 for a flow meter, P1 for a pressure gauge, and LC for a level controller.

In the present invention, first the vacuum pump 4 is set into operation to evauate the interior of the vacuum degasifier column proper 1 to a degree of vacuum on the order of 10 to 40 Torrs, namely a pressure 1 to 10 mmHg plus the saturated steam pressure at the temperature of the raw liquid under treatment. Then, the evacuation is continued to ensure maintenance of the degree of vacuum reached as described above and introduction of the inert gas such as nitrogen gas through the inert gas supply pipe 11 is started to effect spray of the raw liquid from the liquid dispersing device 7. The flow rate of the inert gas in this case is adjusted so that the volumetric flow rate thereof falls in the range of from 0.001 to 1.0, based on the volumetric flow rate of the raw liquid taken as 1. The reason for this particular range is that no sufficient effect is obtained in enhancing the capacity for deaeration if the flow rate is less than 0.001 and the amount of the inert gas suffered to remain dissolved in the treated liquid unduly increases if the flow rate exceeds 1.0. Desirably, the flow rate of the inert gas is such that the volumetric flow rate thereof falls in the range of from 0.01 to 0.5, preferably from 0.03 to 0.08, based on the volumetric flow rate of the raw liquid taken as 1. While the raw liquid sprayed under the conditions described above is falling inside the vacuum degasifier column proper 1, it is deprived of the dissolved gas and allowed to fall into the treated liquid storage part 2 and subsequently forwarded to the next step through the treated liquid transfer pipe 10.

By this method, the dissolved gas and not the inert gas present in the raw liquid is removed in a high ratio because the inert gas is introduced at the prescribed flow rate upwardly into the vacuum degasifier through the lower part thereof and the interior of the vacuum degasifier column proper 1 is continuously evacuated through the top part thereof.

For the present invention, the temperature of the raw liquid to be supplied is desired to be as high as permissible in the light of the fact that the solubility of the gas decreases in proportion as the temperature of the raw liquid increases. The effect of this invention is fully attained when this temperature falls in the approximate range of from 5° to 30° C. at which the water is generally used in a pure water or super-pure water plant.

Now, the present invention will be described specifically below with reference to working examples.

EXAMPLE 1

In the vacuum degasifier column proper 1 illustrated in FIG. 1, with the interior of this column kept at a degree of vacuum of about 25 Torrs, nitrogen gas was continuously introduced upwardly at a flow rate of 0.1 $m^3$/hr through the lower part thereof and, at the same time, a raw water (pure dissolved carbon dioxide gas concentration of 8 ppm) at 25° C. was continuously sprayed downwardly from the liquid dispersing device 7 disposed in the upper part to effect deaeration of the raw water. In the treated water, the dissolved oxygen concentration was 5 ppb and the dissolved carbon dioxide gas concentration was 4.0 ppm.

EXAMPLE 2

The same raw water at 25° C. was subjected to a deaeration treatment by following the procedure of example A, except argon gas was continuously introduced at a flow rate of 0.2 m³/hr in the place of the nitrogen gas.

Comparative Experiment

When the same raw water was treated by following the same procedure as used in the working examples except for omission of the continuous supply of nitrogen gas or argon gas, the treated water had a dissolved oxygen concentration of 20 ppb and a dissolved carbon dioxide gas concentration of 6.5 ppm.

The results of the working examples and the comparative experiment and the conditions of treatment used therein are collectively shown in the following table.

TABLE

| | Example 1 | Example 2 | Comparative Experiment |
|---|---|---|---|
| Raw water | | | |
| Temperature (°C.) | | 25 | |
| Flow rate (m³/h) | | 3 | |
| Dissolved oxygen concentration (ppm) | | 8 | |
| Dissolved $CO_2$ concentration (ppm) | | 8 (pH 7.1) | |
| Degree of vacuum in tower (Torr) | | 25 | |
| Flow rate of inert gas (m³/hr) | 0.1 | 0.2 | — |
| Treated water | | | |
| Dissolved oxygen concentration (ppb) | 5> | 5> | 20 |
| Dissolved $CO_2$ gas concentration (ppm) | 4.0 | 3.8 | 6.5 |

What is claimed is:

1. A method for vacuum deaeration of a dissolved gas in a raw liquid, in a vacuum degasifier column maintained at a pressure slightly higher than a saturated steam pressure at a temperature of the raw liquid, said column having a region filled with packings, spraying the raw liquid downwardly from above the region at a volumetric flow rate and meantime carrying out an evacuation inside said column to maintain said pressure, the method comprising the steps of:
   carrying out said evacuation inside said vacuum degasifier column from above said region; and
   introducing an inert gas upwardly from below said region at a volumetric flow rate in the range of from 0.001 to 1.0, based on the volumetric feed flow rate of said raw liquid taken as 1, simultaneously with said evacuation.

2. A method according to claim 1, wherein the volumetric flow rate of said inert gas is in the range of from 0.01 to 0.5, based on the volumetric feed flow rate of said raw liquid taken as 1.

3. A method according to claim 1, wherein the degree of vacuum inside said vacuum degasifier column is in the range of from A+1 to A+10 mmHg, wherein A mmHg stands for the saturated steam pressure at the temperature of said raw liquid.

4. A method according to claim 1, wherein said inert gas is a nitrogen gas.

5. A method according to claim 1, wherein said raw liquid is a pure water having a specific resistivity of not less than 0.1 MΩ·cm.

6. A method for vacuum deaeration of a dissolved gas in a pure water, said pure water having a specific resistivity of not less than 0.1 MΩ·cm, in a vacuum degasifier column maintained at a pressure slightly higher than a saturated stem pressure at a temperature of the pure water, said column having a region filled with packings, spraying the pure water downwardly from above the region at a volumetric flow rate and meantime carrying out an evacuation inside said column to maintain said pressure, the method comprising the steps of:
   carrying out said evacuation from above said region to maintain a pressure made by adding 1 mmHg to 10 mmHg to the saturate steam pressure at the temperature of the pure water inside said vacuum degasifier column; and
   introducing an inert gas upwardly from below said region at a volumetric flow rate in the range of from 0.001 to 1.0, based on the volumetric feed flow rate of said pure water taken as 1, simultaneously with said evacuation, to lower a dissolved oxygen concentration in said pure water below 10 ppb.

* * * * *

UNITED STATES PATENT AND TRADEMARK OFFICE
CERTIFICATE OF CORRECTION

PATENT NO. : 5,180,403
DATED : January 19, 1993
INVENTOR(S) : MASAHIKO KOGURE

It is certified that error appears in the above-indentified patent and that said Letters Patent is hereby corrected as shown below:

In column 3, line 16, change "gasses" to --gases--.

In column 4, line 53, delete "the" (first occurrence); line 68, after "pure" insert --water having a dissolved oxygen concentration of 8 ppm and a--.

In column 6, line 28, change "stem" to --steam--.

Signed and Sealed this

First Day of February, 1994

Attest:

BRUCE LEHMAN

*Attesting Officer*   Commissioner of Patents and Trademarks